United States Patent
Weng et al.

(10) Patent No.: US 12,282,993 B2
(45) Date of Patent: Apr. 22, 2025

(54) METHOD, APPARATUS, AND SYSTEM FOR GENERATING POSTURE VIRTUAL IMAGE, AND VIRTUAL REALITY DEVICE

(71) Applicant: PIMAX TECHNOLOGY (SHANGHAI) CO., LTD, Shanghai (CN)

(72) Inventors: Zhibin Weng, Shanghai (CN); Ke Zhou, Shanghai (CN)

(73) Assignee: PIMAX TECHNOLOGY (SHANGHAI) CO., LTD, Shanghai (CN)

( * ) Notice: Subject to any disclaimer, the term of this patent is extended or adjusted under 35 U.S.C. 154(b) by 63 days.

(21) Appl. No.: 17/970,867

(22) Filed: Oct. 21, 2022

(65) Prior Publication Data
US 2023/0126697 A1    Apr. 27, 2023

(30) Foreign Application Priority Data
Oct. 22, 2021    (CN) .......................... 202111236336.4

(51) Int. Cl.
*G06T 15/00*    (2011.01)
*G06T 7/50*    (2017.01)
(Continued)

(52) U.S. Cl.
CPC ................ *G06T 15/00* (2013.01); *G06T 7/50* (2017.01); *G06T 13/40* (2013.01); *G06V 40/10* (2022.01)

(58) Field of Classification Search
CPC ....... G06F 3/011; G06F 3/013; G06V 40/165; G06V 40/166; G06V 40/174–176; G06T 13/40
See application file for complete search history.

(56) References Cited

U.S. PATENT DOCUMENTS

2018/0158246 A1*   6/2018   Grau ......................... G06T 3/18
2018/0352150 A1*   12/2018   Purwar ................... G06T 7/536
(Continued)

FOREIGN PATENT DOCUMENTS

CN    108604291 A    9/2018
CN    110678875 A    1/2020
(Continued)

OTHER PUBLICATIONS

First Office Action issued in counterpart Chinese Patent Application No. 202111236336.4, dated Jul. 24, 2024.

*Primary Examiner* — Ryan McCulley
(74) *Attorney, Agent, or Firm* — Westbridge IP LLC

(57) ABSTRACT

Disclosed are a method, an apparatus, and a system for generating a posture virtual image, and a virtual reality device, to resolve a technical problem that the virtual image generated based on the prior art is not realistic enough. A method for generating a posture virtual image of a user includes: separately obtaining initial images of key regions of a first part of a user; extracting position information of feature points from the initial images; integrating the initial images according to position information to generate a first part image; and generating a virtual image according to the first part image. The initial images of the plurality of key regions can represent the first part of the user accurately, thereby a real feature of the first part of the user is accurately presented, and a real-time experience of the user during interaction is improved.

11 Claims, 5 Drawing Sheets

(51) Int. Cl.
*G06T 13/40* (2011.01)
*G06V 40/10* (2022.01)

(56) References Cited

U.S. PATENT DOCUMENTS

2019/0012528 A1* 1/2019 Wilson .................... G06F 3/013
2023/0418370 A1* 12/2023 Wu .................... G02B 27/0093

FOREIGN PATENT DOCUMENTS

| CN | 111798551 A | 10/2020 |
|----|-------------|---------|
| CN | 112416125 A | 2/2021 |

* cited by examiner

METHOD, APPARATUS, AND SYSTEM FOR GENERATING POSTURE VIRTUAL IMAGE, AND VIRTUAL REALITY DEVICE

CROSS-REFERENCE TO RELATED APPLICATIONS

The application claims priority to Chinese Patent Application CN202111236336.4, filed on Oct. 22, 2021, the entire contents of which are incorporated herein by reference.

TECHNICAL FIELD

The disclosure relates to the field of virtual reality technologies, and in particular, to a method, an apparatus, and a system for generating a posture virtual image, and a virtual reality device.

BACKGROUND

Through a head-mounted display device, such as a Virtual Reality (VR) device and a Mixed Reality (MR) device, a user may interact closely with a virtual scene or a mixed reality scene. In a man-machine interaction between the user and the scene, it is general to obtain tracking data of user's head rotation and position movement, or provide a handle to the user or perform interactive tracking on bare-hand to realize interaction between the user's hand and the virtual scene. In some scenes, especially in a multi-person large-space interaction system where a plurality of people interact in a virtual scene, if a facial expression is obtained and applied to complete the interaction, user's immersion in virtual reality will be greatly enhanced.

A face recognition function in existing VR devices is realized through capturing a facial expression image or whole body image of a user and extracting position information of feature points from the facial expression image or the whole body image, and then reproducing a facial expression virtual image or a whole-body virtual image of the user according to the position information to display the user's facial expression in an interactive virtual scene. However, a generated virtual facial expression is not realistic enough and cannot be used to accurately express a facial expression, thereby decreasing real-time experience and presence of the user during interaction.

SUMMARY

In view of this, the present disclosure provides a method, an apparatus, and a system for generating a posture virtual image, and a virtual reality device, to resolve a technical problem that the virtual image generated based on the prior art is not realistic enough and cannot be used to present real posture of the user accurately, which decrease real-time experience and presence of the user during interaction in the prior art.

According to a first aspect of the present disclosure, the present disclosure provides a method for generating a posture virtual image of a user, including:
  constructing a posture model of the user, wherein the posture model comprises a plurality of standard posture images;
  separately obtaining initial images of a plurality of key regions of a first part of the user, and extracting, from the initial images, position information of a plurality of feature points corresponding to each of the plurality of key regions;
  integrating the initial images of the plurality of key regions according to the plurality of key regions and the position information of the plurality of feature points, to generate a first part image of the first part; and
  searching for, in the posture model, a standard posture image having the highest matching degree with the first part image according to the plurality of key regions and the position information of the plurality of feature points and taking the standard posture image as a virtual image of the first part.

According to a second aspect of the present disclosure, the present disclosure provides apparatus for generating a posture virtual image of a user, including:
  a posture model, where the posture model includes a plurality of standard posture images;
  an image obtaining module, configured to separately obtain initial images of a plurality of key regions of a first part of the user, and extracting, from the initial images, position information of a plurality of feature points corresponding to each of the plurality of key regions;
  an image integrating module, configured to integrate the initial images of the plurality of key regions according to the plurality of key regions and the position information of the plurality of feature points, to generate a first part image of the first part; and
  a virtual image generation module, configured to search for, in the posture model, a standard posture image having the highest matching degree with the first part image according to the plurality of key regions and the position information of the plurality of feature points and taking the standard posture image as a virtual image of the first part.

According to a third aspect of the present disclosure, the present disclosure provides a system for generating a posture virtual image of a user, including:
  a plurality of image capturing devices, configured to respectively capture initial images of a plurality of key regions of a first part of a user; and
  a device for generating a posture virtual image of a user, configured to obtain the initial images of the plurality of key regions of the first part of the user captured by the plurality of image capturing devices, and generate a virtual image of the first part.

According to a fourth aspect of the present application, the present disclosure provides a virtual reality device, including:
  the system for generating a posture virtual image described above; and
  a display device, configured to display a virtual image generated by the system for generating a posture virtual image.

According to the method for generating a posture virtual image of a user provided in the present disclosure, a first part image of a first part of the user is generated by separately collecting initial images of key regions (such as an eye, and a mouth of a face) of the first part (such as a face and a limb) of the user, then extracting position information of feature points from each of the initial images and integrating the initial images of key regions according to the position information of the feature points. And then the first part image is input to a posture model, which is used for searching for a standard posture image having the highest matching degree with the first part image, and the standard posture image is taken as a virtual image of the first part. During collection of the image of the first part of the user, an image of an entire first part of the user is not collected, but the initial images of a plurality of key regions that can represent the first part of the user are accurately collected. In this case, accuracy of extracted position information is relatively high when position information of the feature points is extracted from the initial image of each key region. Therefore, matching accuracy is relatively high when the position information of the feature points is used to match a standard posture image having the highest matching degree with the first part image of the first part in the posture model. Thus, the accuracy and fidelity of the generated virtual image of the first part is relatively high, a real feature of the first part of the user is accurately presented, and a real-time experience of the user during interaction is improved.

BRIEF DESCRIPTION OF THE DRAWINGS

Through a more detailed description of the embodiments of the present disclosure with reference to the accompanying drawings, the above and other purposes, features and advantages of the present disclosure will become more obvious. The accompanying drawings are provided for further understanding of the present disclosure, and constitute a part of the specification. The accompanying drawings and the embodiments of the present disclosure are used to explain the present disclosure and do not constitute a limitation to the present disclosure. In the accompanying drawings, a same reference symbol is used for representing a same component or step.

DETAILED DESCRIPTION OF THE EMBODIMENTS

Figure 1:
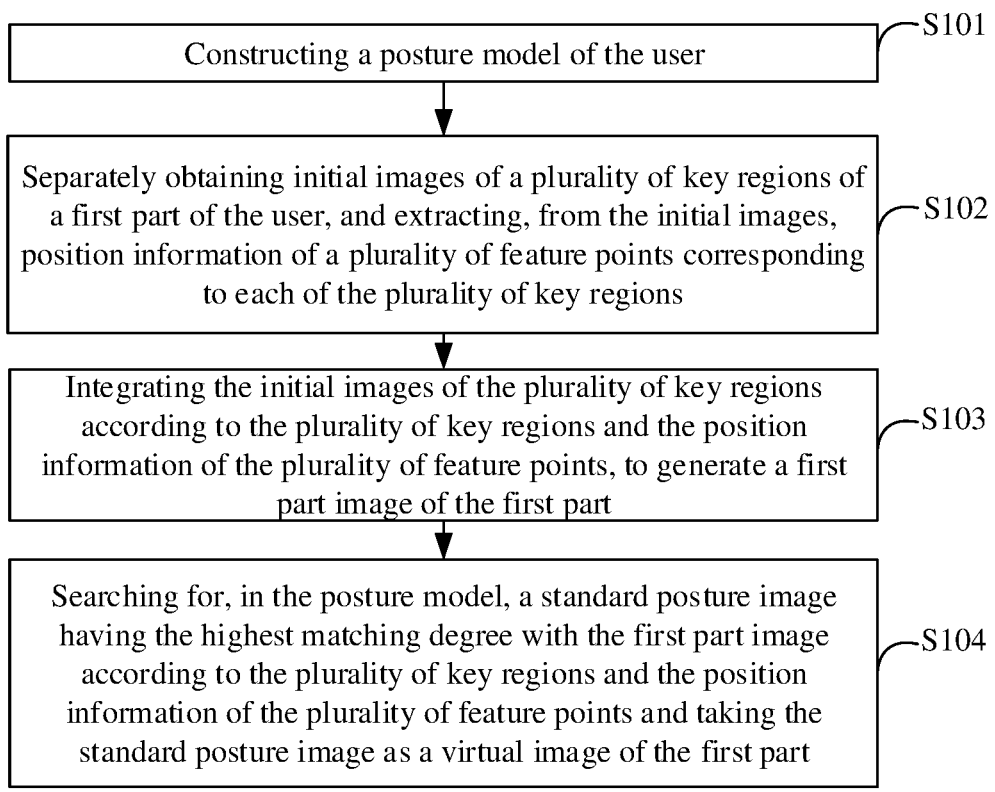
FIG. 1 is a schematic flowchart of a method for generating a posture virtual image of a user according to an embodiment of the present disclosure.

In the description of the present disclosure, "a plurality of" means at least two, for example, two or three, unless otherwise clearly and specifically limited. All the directional indications (such as upper, lower, left, right, front, back, top, and bottom) in the embodiments of the present disclosure are merely used to explain a relative position relationship, motion situations, and the like of the components in a specific gesture (as shown in the figures). If the specific gesture changes, the directional indication also changes accordingly. In addition, the terms "include", "comprise", and any variation thereof are intended to cover non-exclusive inclusion. For example, a process, method, system, product, or device that includes a series of steps or units is not necessarily limited to those listed steps or units, but optionally further includes steps or units that are not listed, or optionally further includes steps or units that are inherent to such a process, method, system, product, or device.

The "embodiment" mentioned in this specification means that a specific feature, structure, or characteristic described in combination with the embodiment may be included in at least one embodiment of the present disclosure. The appearances of such phrase in various places in the specification are not necessarily all referring to a same embodiment, nor are separate or alternative embodiments mutually exclusive of other embodiments. It may be explicitly or implicitly appreciated by those skilled in the art that the embodiments described herein may be combined with other embodiments.

In the following, the technical solutions are clearly and completely described in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts fall within the protection scope of the present disclosure.

Overview

A face recognition function in an existing VR device is realized through capturing a facial expression image or a whole body image of a user and extracting position information of feature points from the facial expression image or the whole body image, and then reproducing a facial expression virtual image or a whole-body virtual image of the user according to the position information to display the user's facial expression in an interactive virtual scene. However, a generated virtual facial expression is not realistic enough and cannot be used to accurately express a facial expression, which decreases real-time experience and presence of the user during interaction.

According to a method for generating a posture virtual image of a user provided in the present disclosure, a first part image of a first part of the user is generated by separately collecting initial images of key regions (such as an eye, and a mouth of a face) of the first part (such as a face and a limb) of the user, then extracting position information of feature points from each of the initial images and integrating the initial images of key regions according to the positon information of the feature points. And then the first part image is input to a posture model, which is used for searching for a standard posture image having the highest matching degree with the first part image, and the standard posture image is taken as a virtual image of the first part. During collection of the image of the first part of the user, an image of an entire first part of the user is not collected, but the initial images of a plurality of key regions that can represent the first part of the user are accurately collected. In this case, accuracy of extracted position information is relatively high when position information of the feature points is extracted from the initial image of each key region. Therefore, matching accuracy is relatively high when the position information of the feature points is used to match a standard posture image having the highest matching degree with the first part image of the first part in the posture model. Thus, the accuracy and fidelity of the generated virtual image of the first part is relatively high, a real feature of the first part of the user is accurately presented, and a real-time experience of the user during interaction is improved.

Based on the brief introduction of the implementation principle of the present disclosure, the technical solutions in the embodiments of the present disclosure will be described clearly and completely below with reference to the accompanying drawings in the embodiments of the present disclosure.

Exemplary Methods

FIG. 1 is a schematic flowchart of a method for generating a posture virtual image of a user according to an embodiment of the present disclosure. The method may be performed by apparatus for generating a posture virtual image of a user or a server. As shown in FIG. 1, the method for generating a posture virtual image of a user includes the following steps.

Step S101: constructing a posture model of the user.

Therein, the posture model includes a plurality of standard posture images.

Specifically, the posture model may include at least one of a facial expression model, a limb body model, and a facial expression-limb body model. When the posture model includes the facial expression model, the posture model is generally used to generate a virtual image of a face of the user. When the posture model includes a body model, the posture model is generally used to generate a virtual image of a body of the user, namely, to generate a virtual image of limbs of the user.

Step S102: separately obtaining initial images of a plurality of key regions of a first part of the user, and extracting, from the initial images, position information of a plurality of feature points corresponding to each of the plurality of key regions.

Specifically, when the step of obtaining initial images of a plurality of key regions of a first part of the user is executed, the initial images of the plurality of key regions of the first part of the user are obtained at a same time.

Specifically, the first part of the user may include the face, the limbs, and the body. When a virtual image of the face of the user needs to be generated, in step S102, initial images of a plurality of key regions of the face need to be collected. For example, a mouth initial image and an eye initial image are collected separately, and then position information of a plurality of mouth feature points is extracted from the mouth initial image and position information of a plurality of eye feature points is extracted from the eye initial image.

When a virtual image of the whole body of the user needs to be generated, in Step S102, initial images of a plurality of key regions of the face and the limbs need to be collected. For example, the mouth initial image of the mouth, the eye initial image of the eye, a left-limb initial image of a left limb, and a right-limb initial image of a right limb are collected separately; and then position information of a plurality of mouth feature points is extracted from the mouth initial image, position information of a plurality of eye feature points is extracted from the eye initial image, position information of a plurality of right-limb feature points is extracted from the right-limb initial image, and position information of a plurality of left-limb feature points is extracted from the left-limb initial image.

Step S103: integrating the initial images of the plurality of key regions according to the plurality of key regions and the position information of the plurality of feature points, to generate a first part image of the first part.

In step S102, the initial images of the plurality of key regions of the first part and the position information of the feature points extracted from the initial image of each key region are obtained; and in Step S103, the initial images of the plurality of key regions are integrated according to the obtained position information of the feature points, to generate the first part image of the first part.

For example, when the first part is the face, the eye initial image and the mouth initial image are integrated according to the position information of a plurality of eye feature points extracted from the eye initial image and the position information of a plurality of mouth feature points extracted from the mouth initial image, to generate a facial expression image of the face. In a process of generating the facial expression image, position information of feature points in another region of the face (for example, position information of an eyebrow feature point of an eyebrow, position information of a check feature point of the check, and position information of a chin feature point of a chin) may be derived according to the position information of the plurality of mouth feature points and the position information of the plurality of eye feature point, and then the mouth initial image and the eye initial image are integrated according to the position information of the plurality of mouth feature points, the position information of the plurality of eye feature points, and the position information of the feature points in the another region of the face, to generate the facial expression image. In the process of generating the facial expression image, the facial expression image of the user may alternatively be integrated according to the position information of the plurality of mouth feature points and the position information of the plurality of eye feature points directly. That is, there is no need to derive position information of the feature points of another first part of the face according to the position information of the plurality of mouth feature points and the position information of the plurality of eye feature points.

Step S104: searching for, in the posture model, a standard posture image having the highest matching degree with the first part image according to the plurality of key regions and the position information of the plurality of feature points and taking the standard posture image as a virtual image of the first part.

During generation of the virtual image of the first part in step S104, there may be various specific representation forms for the virtual image. For example, the virtual image may virtually display a facial expression of the user in a form of a robot, or in a form of a cartoon character. A specific representation form of the virtual image is not limited in the present disclosure.

According to the method for generating a posture virtual image of a user provided in the present disclosure, a first part image of a first part of the user is generated by separately collecting initial images of key regions (such as an eye, and a mouth of a face) of the first part (such as a face and a limb) of the user, then extracting position information of feature points from each of the initial images and integrating the initial images of key regions according to the position information of the feature points. And then the first part image is input to a posture model, which is used for searching for a standard posture image having the highest matching degree with the first part image, and the standard posture image is taken as a virtual image of the first part. During collection of the image of the first part of the user, an image of an entire first part of the user is not collected, but the initial images of a plurality of key regions that can represent the first part of the user are accurately collected separately. In this case, accuracy of extracted position information is relatively high when position information of the feature points is extracted from the initial image of each key region. Therefore, matching accuracy is relatively high when the position information of the feature points is used to match a standard posture image having the highest matching degree with the first part image of the first part in the posture model. Thus, the accuracy and fidelity of the generated virtual image of the first part is relatively high, a real feature of the first part of the user is accurately presented, and a real-time experience of the user during interaction is improved.

Figure 2:
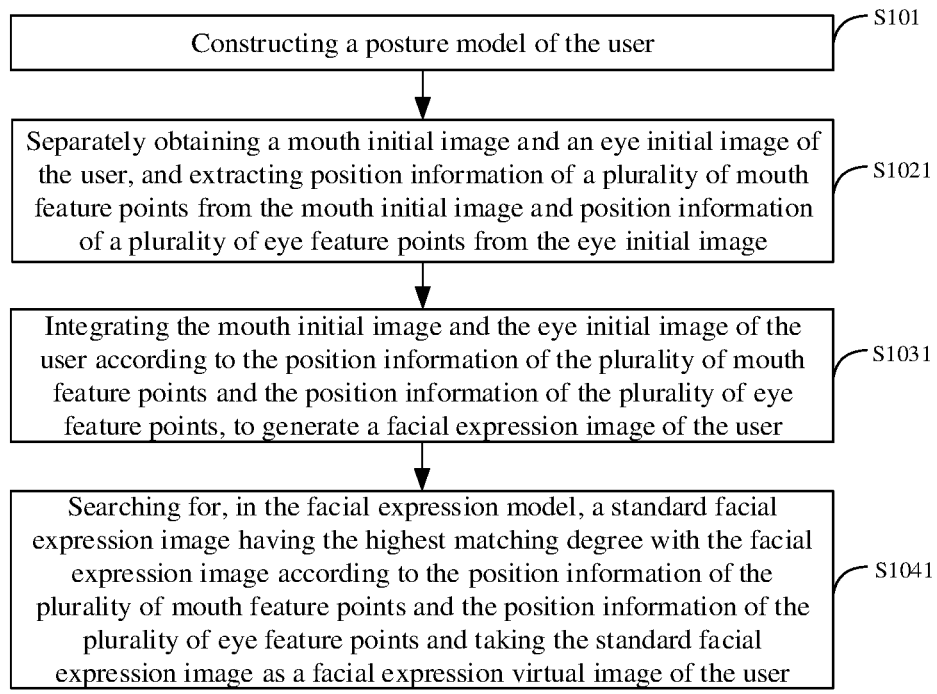
FIG. 2 is a schematic flowchart of a method for generating a posture virtual image of a user according to another embodiment of the present disclosure.

In another embodiment of the present disclosure, FIG. 2 is a schematic flowchart of a method for generating a posture virtual image of a user according to the present disclosure. As shown in FIG. 2, the first part is a face, and the posture model includes a facial expression model. The facial expression model includes a plurality of standard facial expression images. That is, a facial expression virtual image is generated by virtualizing the face of the user. In this case, step S102 (separately obtaining initial images of a plurality of key regions of a first part of the user, and extracting, from the initial images, position information of a plurality of feature points corresponding to each of the plurality of key regions) specifically includes the following steps.

Step S1021: separately obtaining a mouth initial image and an eye initial image of the user, and extracting position information of a plurality of mouth feature points from the mouth initial image and position information of a plurality of eye feature points from the eye initial image.

During generation of the facial expression virtual image of the user, a facial expression representation region of a person mainly includes the mouth, cheeks, eyes, eyebrows, and forehead, and expression representation of the mouth and the eyes has the greatest impact on facial expression of the person. Therefore, when a facial expression of the user is virtualized, since images of the eyes the mouth are obtained separately, the virtual image of an entire facial expression of the user virtualized through the eyes and mouth is realistic. Therefore, the eye initial image and the mouth initial image are obtained to extracted position information of a plurality of eye feature points from the eye initial image and position information of a plurality of mouth feature points from the mouth initial image.

Specifically, the position information of the plurality of eye feature points includes: position information of an upper eyelid feature point, namely, position information of a feature point at a region between the eye and an eyebrow; position information of a lower eyelid feature point, namely, position information of a feature point at a region between an eye and a cheek; position information of a first canthus feature point and a second canthus feature point respectively located on both sides of the eye, namely, position information of a feature point at a region between the left corner of the eye and the nose; and position information of a feature point at a region near the right corner of the eye.

Step S103 (integrating the initial images of the plurality of key regions according to the plurality of key regions and the position information of the plurality of feature points, to generate a first part image of the first part) specifically includes the following steps.

Step S1031: integrating the mouth initial image and the eye initial image of the user according to the position information of the plurality of mouth feature points and the position information of the plurality of eye feature points, to generate a facial expression image of the user.

A manner of integrating the mouth initial image and the eye initial image according to the position information of the plurality of mouth feature points and the position information of the plurality of eye feature points in step S1031 includes, but not limited to, the following two manners:

(1) Integration manner 1: deriving position information of feature points of another region of the face (for example, position information of an eyebrow feature point of an eyebrow, position information of a cheek feature point of the cheek, and position information of a chin feature point of a chin) according to the position information of the plurality of mouth feature points and the position information of the plurality of eye feature points, and then integrating the mouth initial image and the eye initial image according to the position information of the plurality of mouth feature points, the position information of the plurality of eye feature points, and the position information of the feature points of another region of the face, to generate the facial expression image.

(2) Integration manner 2: directly integrating the mouth initial image and the eye initial image according to the position information of the plurality of mouth feature points, the position information of the plurality of eye feature points to generate the facial expression image, which means that there is no need to derive the position information of the feature points of another first part of the face according to the position information of the plurality of mouth feature points and the position information of the plurality of eye feature points.

Step S104 (searching for, in the posture model based on the plurality of key regions and the position information of the plurality of feature points, a standard posture image having the highest matching degree with the first part image of the first part, and using the standard posture image as a virtual image of the first part) specifically includes the following steps.

Step S1041: searching for, in the facial expression model, a standard facial expression image having the highest matching degree with the facial expression image according to the position information of the plurality of mouth feature points and the position information of the plurality of eye feature points and taking the standard facial expression image as a facial expression virtual image of the user.

The foregoing steps S1021 to S1041 are a process of generating the facial expression virtual image of the user according to a real facial expression of the user when the face of user is virtualized to generate a facial expression virtual image. Initial images of the eyes and the mouth that can best reflect a facial expression are separately collected targetedly. Then the position information of the plurality of eye feature points is extracted from the eye initial image, and the position information of the plurality of mouth feature points is extracted from the mouth initial image. A real facial expression of the user is virtualized according to the position information of the plurality of eye feature points and the position information of the plurality of mouth feature points, to generate a facial expression virtual image of the user. Since the initial images of the eyes and the mouth are separately obtained, accuracy and precision of the position information of the plurality of eye feature points and the position information of the plurality of mouth feature points that are extracted respectively from the obtained initial images of the eyes and mouth are relatively high. Therefore, when the facial expression virtual image is generated, the accuracy and fidelity of the generated facial expression virtual image is relatively high, and a real feature of the facial expression of the user is accurately presented, and a real-time experience and presence of the user during interaction is improved.

Optionally, in step S1021, when the eye initial image of the user is obtained, two eye initial images of the two eyes may be separately obtained, that is, a left-eye initial image and a right-eye initial image may be obtained separately. Accordingly, position information of a plurality of feature points of a left eye needs to be extracted from the left-eye initial image, and position information of a plurality of feature points of a right eye needs to be extracted from the right-eye initial image. In step S1031, when the eye initial image and the mouth initial image are integrated to generate a facial expression image, the left-eye initial image, the right-eye initial image and the mouth initial image need to be integrated according to the position information of the plurality of feature points of the left eye, the position information of the plurality of feature points of the left eye, and the position information of the mouth feature points, to generate the facial expression image. Accordingly, in step S1041, when the facial expression virtual image is generated, the standard facial expression image having the highest matching degree with the facial expression image is searched for in the facial expression model according to the position information of the plurality of feature points of the left eye, the position information of the plurality of feature points of the left eye, and the position information of the mouth feature points, and the standard facial expression image is taken as the facial expression virtual image of the face of the user.

Figure 3:
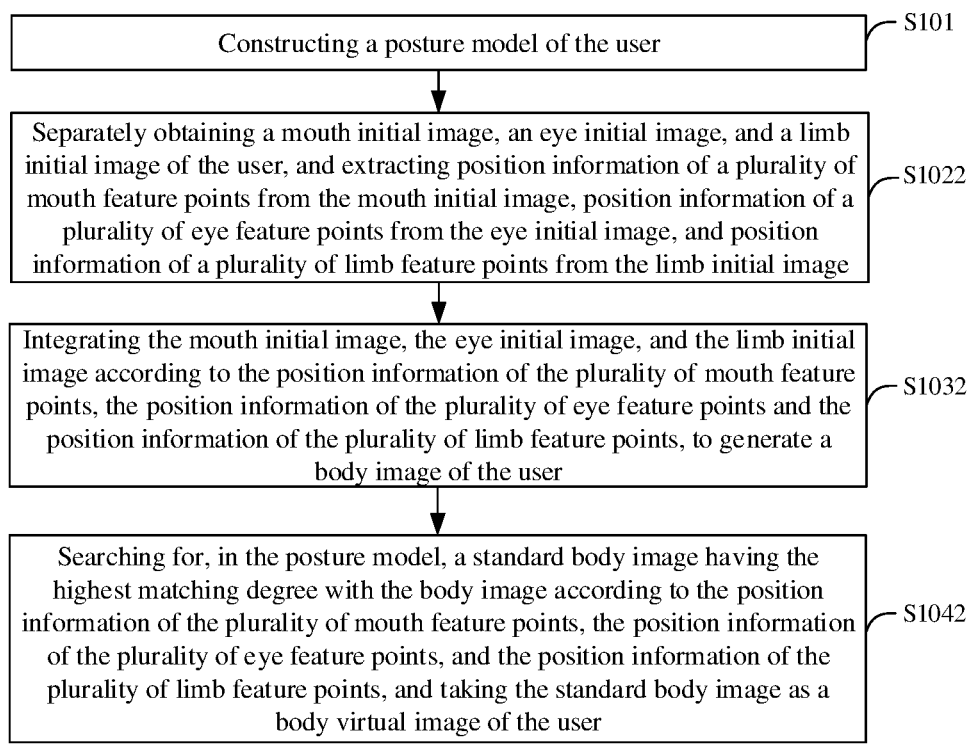
FIG. 3 is a schematic flowchart of a method for generating a posture virtual image of a user according to another embodiment of the present disclosure.

In another embodiment of the present disclosure, FIG. 3 is a schematic flowchart of a method for generating a posture virtual image of a user according to the present disclosure. As shown in FIG. 3, when the first part is a body, and the posture model includes a body model. The body model includes a plurality of standard body images. That is, a body virtual image is generated by virtualizing the whole body of the user, thereby displaying a virtual image of an entire shape of the user. In this case, step S102 (separately obtaining initial images of a plurality of key regions of a first part of the user, and extracting, from the initial images, position information of a plurality of feature points corresponding to each of the plurality of key regions) specifically includes the following steps.

Step S1022: Separately obtaining a mouth initial image, an eye initial image, and a limb initial image of the user, and extracting position information of a plurality of mouth feature points from the mouth initial image, position information of a plurality of eye feature points from the eye initial image, and position information of a plurality of limb feature points from the limb initial image.

During generation of the body virtual image of the user, human actions are mainly expressed through limbs and facial expressions, and facial expressions are mainly expressed in the mouth and eyes. Therefore, the eye initial image, the mouth initial image, and the limb initial image are obtained to extract the position information of the plurality of eye feature points from the eye initial image, the position information of the plurality of mouth feature points from the mouth initial image, and the position information of the plurality of limb feature points from the limb initial image; and then the position information of the plurality of eye feature points, the position information of the plurality of mouth feature points and the position information of the plurality of limb feature points are used as main reference points to match a standard body image in the body model, and the standard body image is taken as the body virtual image of the user.

Step S103 (integrating the initial images of the plurality of key regions according to the plurality of key regions and the position information of the plurality of feature points, to generate a first part image of the first part) specifically includes the following steps.

Step S1032: Integrating the mouth initial image, the eye initial image, and the limb initial image according to the position information of the plurality of mouth feature points, the position information of the plurality of eye feature points and the position information of the plurality of limb feature points, to generate a body image of the user.

A manner of integrating the mouth initial image, the eye initial image, and the limb initial image according to the position information of the plurality of mouth feature points, the position information of the plurality of eye feature points, and the position information of the plurality of limb feature points, to generate a body image of the user in step S1032 includes, but not limited to, the following two manners.

(1) Integration manner 1: deriving position information of feature points of another region of the face (for example, position information of an eyebrow feature point of an eyebrow, position information of a check feature point of the check, and position information of a chin feature point of a chin) according to the position information of the plurality of mouth feature points and the position information of the plurality of eye feature points, and then integrating the mouth initial image and the eye initial image according to the position information of the plurality of mouth feature points, the position information of the plurality of eye feature points, and the position information of the feature points of another region of the face, to generate the facial expression image;

deriving position information of feature points of another region of the limb according to the position information of the limb feature points, for example, deriving position information of feature points of another first part of a lower limb according to position information of a plurality of knee feature points, position information of a plurality of thigh feature points, position information of a plurality of hip feature points, and position information of a plurality of foot feature points, and then integrating the facial expression image and the limb initial image according to the position information of the plurality of limb feature points to generate the body image of the user.

(2) Integration manner 2: directly integrating the facial expression image and the limb initial image to generate the body image of the user according to the position information of the plurality of mouth feature points, the position information of the plurality of eye feature points, and the position information of the plurality of limb feature points, which means that there is no need to derive the position information of the feature points of the another first part of the face according to the position information of the plurality of mouth feature points and the position information of the plurality of eye feature points, and there is no need to derive the position information of the feature points of the another limb region according to the position information of the limb feature points either.

Step S104 (searching for, in the posture model based on the plurality of key regions and the position information of the plurality of feature points, a standard posture image having the highest matching degree with the first part image of the first part, and using the standard posture image as a virtual image of the first part) specifically includes the following steps.

Step S1042: searching for, in the posture model, a standard body image having the highest matching degree with the body image according to the position information of the plurality of mouth feature points, the position information of the plurality of eye feature points, and the position information of the plurality of limb feature points, and taking the standard body image as a body virtual image of the user.

The foregoing steps S1022 to S1042 are as follows: virtualizing an action of the user, that is, virtualizing the body of the user to generate the body virtual image of the user, thereby displaying the virtual image of the entire shape of the user. Initial images of the eyes and the mouth that can best reflect a facial expression and the limb initial image that can best represent the action of the user are separately collected targetedly. Then the position information of the plurality of eye feature points is extracted from the eye initial image, the position information of the plurality of mouth feature points is extracted from the mouth initial image, and the position information of the plurality of limb feature points is extracted from the limb initial image. A real action of the user is virtualized according to the position information of the plurality of eye feature points, the position information of the plurality of mouth feature points, and the position information of the plurality of limb feature points, to generate a body virtual image, thereby displaying a virtual image of an entire shape of the user. Since the initial images of the eye, the mouth, and the limb are separately obtained, accuracy and precision of the extracted position information of the plurality of eye feature points, the position information of the plurality of mouth feature points, and the position information of the plurality of limb feature points are relatively high. Therefore, the accuracy and fidelity of the generated body virtual image is relatively high, and a real feature of the facial expression of the user is accurately presented, and a real-time experience and presence of the user during interaction is improved.

Optionally, the limb of the user may include a left upper limb, a left lower limb, a right upper limb, and a right lower limb. Therefore, when step S1022 is executed, and when "obtaining the limb initial image" in step S1022 is executed, the specific step for obtaining the limb initial image may include:

obtaining a left upper limb initial image of the left upper limb, a left lower limb initial image of the left lower limb, a right upper limb initial image of the right upper limb, and a right lower limb initial image of the right lower limb separately.

The step of extracting position information of a plurality of limb feature point from the limb initial image may specifically include the following steps.

Step (1): extracting position information of a plurality of feature points of the left upper limb from the left upper limb initial image, where the position information of a plurality of feature points of the left upper limb includes but is not limited to: position information of a shoulder feature point, position information of a left-arm feature point, position information of a left-elbow feature point, position information of a left-wrist feature point, and position information of a left-hand feature point.

Step (2): extracting position information of a plurality of feature points of the right upper limb from the right upper limb initial image, where the position information of a plurality of feature points of the right upper limb includes but is not limited to: position information of a shoulder feature point, position information of a right-arm feature point, position information of a right-elbow feature point, position information of a right-wrist feature point, and position information of a right-hand feature point.

Step (3): extracting position information of a plurality of feature points of the left lower limb from the left lower limb initial image, where the position information of a plurality of feature points of the left lower limb includes but is not limited to: position information of a left-knee feature point, position information of a left-thigh feature point, position information of a left-hip feature point, and position information of a left-foot feature point.

Step (4): extracting position information of a plurality of feature points of the right lower limb from the right lower limb initial image, where the position information of a plurality of feature points of the right lower limb includes but is not limited to: position information of a right-knee feature point, position information of a right-thigh feature point, position information of a right-hip feature point, and position information of a right-foot feature point.

In this case, when "integrating the eye initial image, the mouth initial image, and the limb initial image" in Step S1032 is executed, the step of the integrating the eye initial image, the mouth initial image, and the limb initial image specifically includes the following steps.

Step S21: integrating the mouth initial image and the eye initial image according to the position information of the plurality of mouth feature points and the position information of the plurality of eye feature points, to generate the facial expression image;

Step S22: integrating the left-upper limb initial image, the left-lower limb initial image, the right-upper limb initial image, and the right-lower limb initial image according to the position information of the plurality of feature points of the left upper limb, the position information of the plurality of feature points of the left lower limb, the position information of the plurality of feature points of the right upper limb, and the position information of the plurality of feature points of the right lower limb, to generate the limb initial image; and Step S23: integrating the limb initial image and the facial expression image to generate the body image.

The initial images of four limbs (the left upper limb, the left lower limb, the right upper limb, and the right lower limb) of the user are collected separately, so that position information of the feature points of the four limbs may be accurately extracted in the process of virtualizing actions of the limbs. Therefore, when a body virtual image is generated, the generated body virtual image has relatively high fidelity, and can accurately express a real feature of a facial expression of the user, improving real-time experience and presence of the user during interaction.

Figure 4:
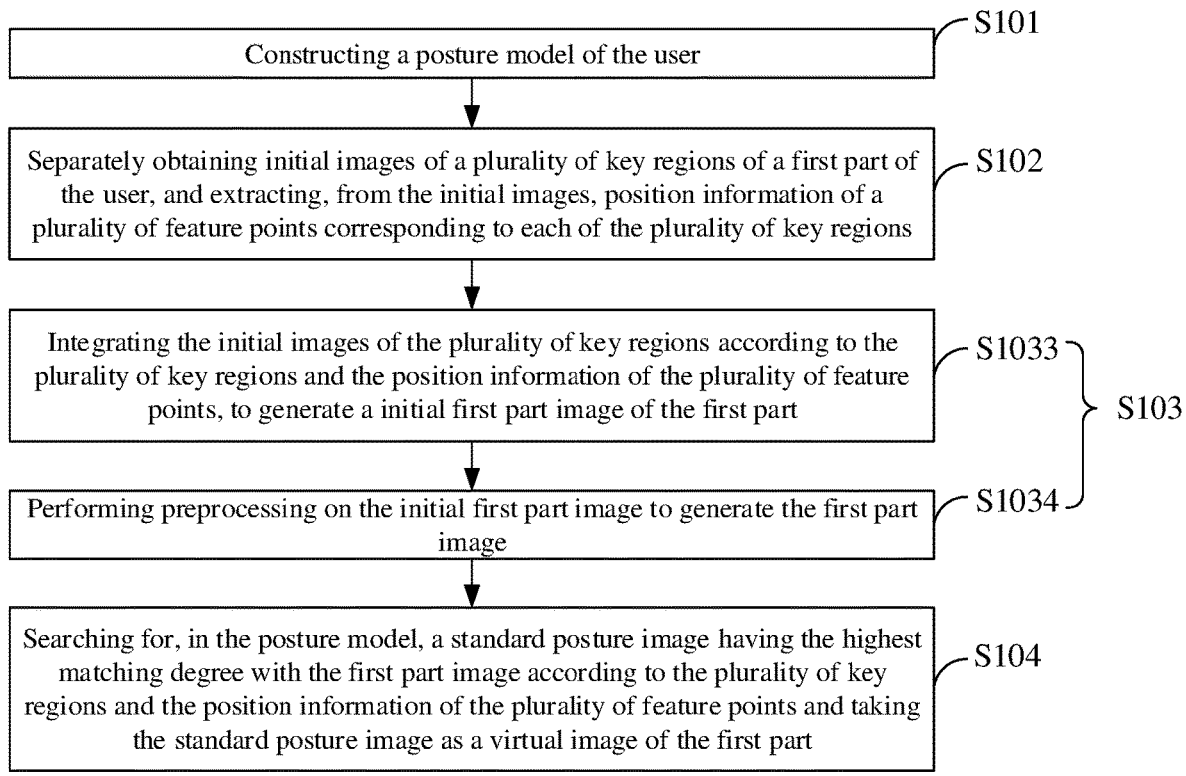
FIG. 4 is a schematic flowchart of a method for generating a posture virtual image of a user according to another embodiment of the present disclosure.

In another embodiment of the present disclosure, FIG. 4 is a schematic flowchart of a method for generating a posture virtual image of a user according to another embodiment of the present disclosure. As shown in FIG. 4, Step S103 (integrating the initial images of the plurality of key regions according to the plurality of key regions and the position information of the plurality of feature points, to generate a first part image of the first part) specifically includes the following steps.

Step S1033: integrating the initial images of the plurality of key regions according to the plurality of key regions and the position information of the plurality of feature points, to generate a initial first part image of the first part; and Step S1034: performing preprocessing on the initial first part image to generate the first part image.

When the initial first part image is preprocessed in step S1034, methods such as image de-noising processing and illumination compensation processing may be used to preprocess the initial first part image, to generate the first part image. Thus, accuracy and fidelity of the first part virtual image generated may be further improved, and a real feature of the first part of the user can be accurately expressed, improving real-time experience and presence of the user during interaction.

Exemplary Apparatus

Figure 5:
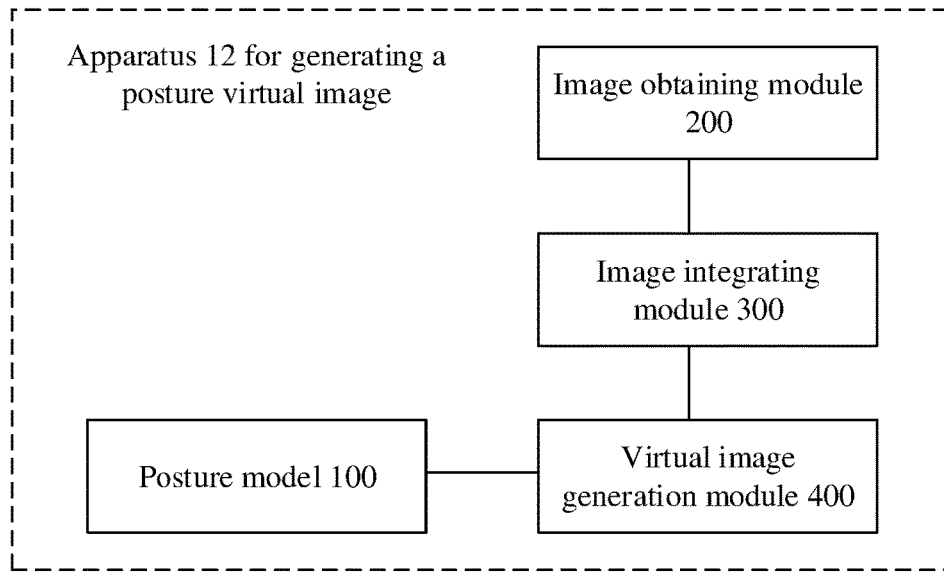
FIG. 5 is a working principle diagram of apparatus for generating a posture virtual image of a user according to an embodiment of the present disclosure.

FIG. 5 is a working principle diagram of an apparatus for generating a posture virtual image of a user according to the present disclosure. As shown in FIG. 5, the apparatus 12 for generating a posture virtual image of a user includes: a posture model 100, which includes a plurality of standard posture images of a first part; an image obtaining module 200, configured to separately obtain initial images of a plurality of key regions of the first part of the user, and extract, from the initial images, position information of feature points of the a plurality of key regions; an image integrating module 300, configured to integrate initial images of the plurality of key regions according to the plurality of key regions and the position information of the feature points of the plurality of key regions, to generate a first part image of the first part; and a virtual image generation module 400, configured to search for, in the posture model, a standard posture image having the highest matching degree with the first part image of the first part, according to the plurality of key regions and the position information of the feature points of the plurality of key regions, and take the standard posture image as a virtual image of the first part.

According to the apparatus for generating a posture virtual image of a user provided in the present disclosure, a first part image of a first part of the user is generated by separately collecting initial images of key regions (such as an eye, and a mouth of a face) of the first part (such as a face and a limb) of the user, then extracting position information of feature points from each of the initial images and integrating the initial images of key regions according to the position information of the feature points. And then the first part image is input to a posture model, which is used for searching for a standard posture image having the highest matching degree with the first part image, and the standard posture image is taken as a virtual image of the first part. During collection of the image of the first part of the user, an image of an entire first part of the user is not collected, but the initial images of a plurality of key regions that can represent the first part of the user are accurately collected. In this case, accuracy of extracted position information is relatively high when position information of the feature points is extracted from the initial image of each key region. Therefore, matching accuracy is relatively high when the position information of the feature points is used to match a standard posture image having the highest matching degree with the first part image of the first part in the posture model. Thus, the accuracy and fidelity of the generated virtual image of the first part is relatively high, a real feature of the first part of the user is accurately presented, and a real-time experience of the user during interaction is improved.

Exemplary System

Figure 6:
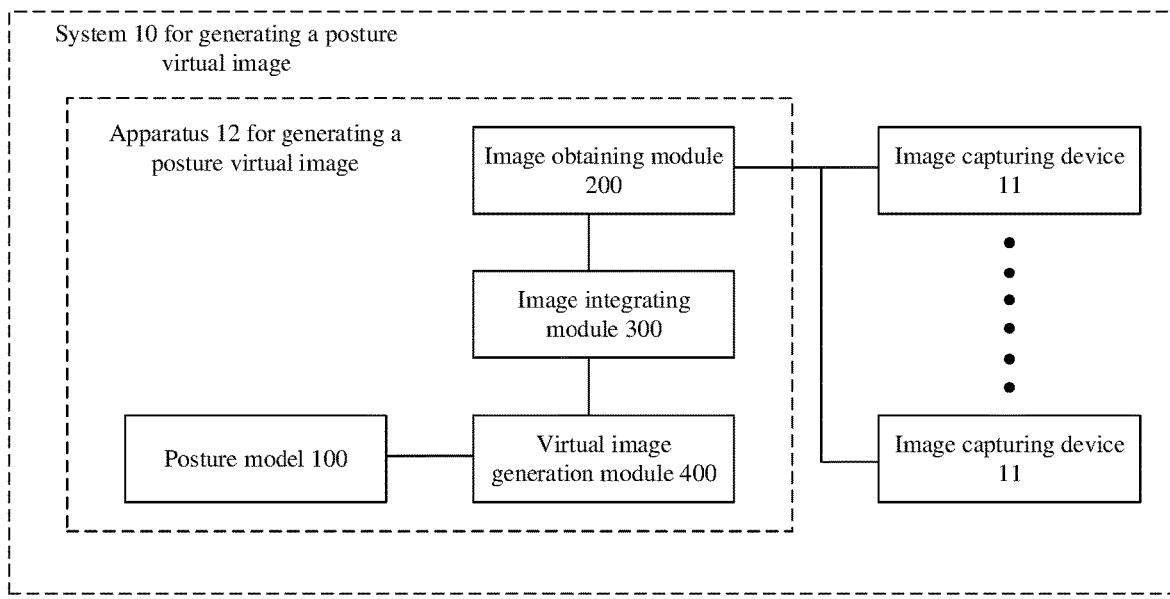
FIG. 6 is a working principle diagram of a system for generating a posture virtual image of a user according to an embodiment of the present disclosure.

FIG. 6 is a working principle diagram of a system for generating a posture virtual image of a user according to the present disclosure. As shown in FIG. 6, the system 10 for generating a posture virtual image includes: a plurality of image capturing devices 11, configured to respectively capture initial images of a plurality of key regions of a first part of a user; and the apparatus 12 for generating a posture virtual image of a user, configured to obtain the initial images of the plurality of key regions captured by the plurality of image capturing devices 11, and generate a virtual image of the first part.

The system for generating a posture virtual image of a user provided by the present disclosure may be applied in any scenario requiring human-computer interaction, such as a virtual reality device, an augmented display device, and a mixed reality device.

Figure 7:
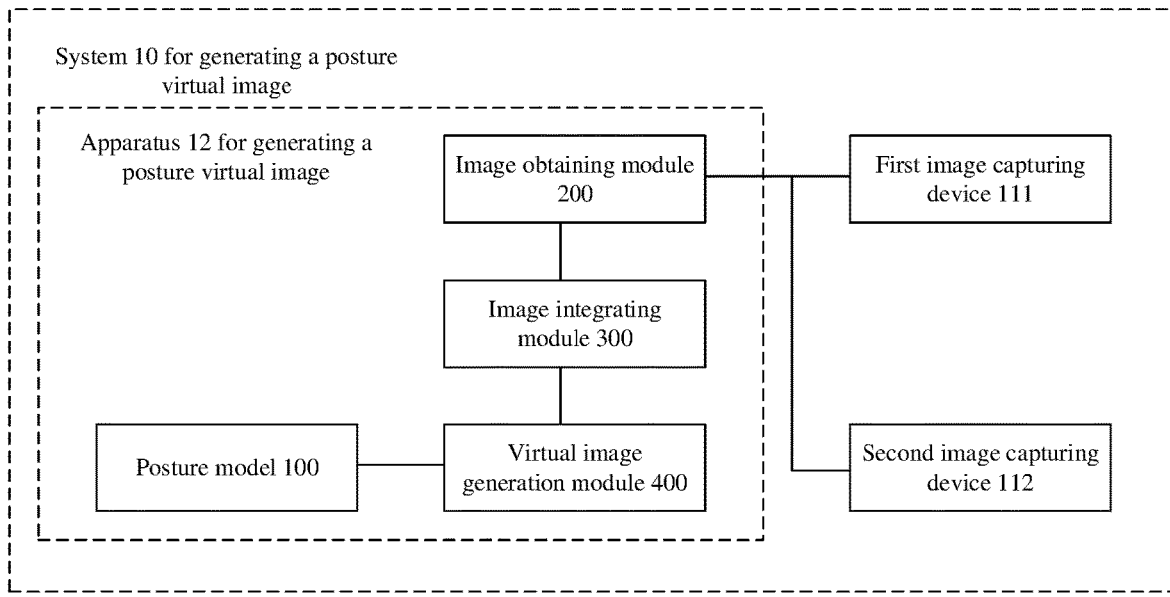
FIG. 7 is a working principle diagram of a system for generating a posture virtual image of a user according to another embodiment of the present disclosure.

In an embodiment of the present disclosure, as shown in FIG. 7, the plurality of image capturing devices 11 include: a first image capturing device 111, configured to capture an eye initial image; and a second image capturing device 112, configured to capture a mouth initial image. The eye initial image captured by the first image capturing device and the mouth initial image captured by the second image capturing device are transmitted to the apparatus for generating a posture virtual image, and the apparatus for generating a posture virtual image generates a facial expression virtual image of the user according to the mouth initial image and eye initial image. A specific method for generating the facial expression virtual image is as described in the above-mentioned method for generating a posture virtual image, which will not be repeated herein.

Optionally, to make the facial expression virtual image of the user more realistic, the first image capturing device includes a first sub-image capturing device and a second sub-image capturing device. The first sub-image capturing device and the second sub-image capturing device are respectively configured to capture a left eye initial image of the left eye and a right eye initial image of the right eye.

In another embodiment of the present disclosure, the plurality of image capturing devices further include: a third image capturing device, configured to capture a limb initial image. That is, the plurality of image capturing devices include a first image capturing device, a second image capturing device, and a third image capturing device. The first image capturing device, the second image capturing device, and the third image capturing device respectively capture the eye initial image, the mouth initial image, and the limb initial image of the user. The eye initial image, the mouth initial image, and the limb initial image are transmitted to the apparatus for generating a posture virtual image. The apparatus for generating a posture virtual image generates a body virtual image of the user according to the mouth initial image, the eye initial image, and the limb initial image. A specific method for generating the body virtual image is as described in the above-mentioned method for generating a posture virtual image, which will not be repeated herein. In the present disclosure, three image capturing devices are used to respectively capture initial images of three key first parts (an eye, the mouth, and a limb) of the user, and generate the body virtual image of the user.

Optionally, to make the body virtual image of the user more realistic, the third image capturing device includes a third sub-image capturing device and a fourth sub-image capturing device. The third sub-image capturing device and the fourth sub-image capturing device are respectively configured to capture a left limb image of a left limb and capture a right limb image of a right limb of the user.

Optionally, to further make the body virtual image of the user more realistic, the third sub-image capturing device may further include a left upper limb image capturing device and a left lower limb image capturing device for respectively capturing a left upper limb initial image of the left upper limb and a left lower limb initial image of the left lower limb of the user.

Similarly, the fourth sub-image capturing device may further include a right upper limb image capturing device and a right lower limb image capturing device for respectively capturing a right upper limb initial image and a right lower limb initial image of the user.

Optionally, any of the foregoing image capturing devices (for example, the first image capturing device, the second image capturing device, the third image capturing device, the first sub-image capturing device, the second sub-image capturing device, the third sub-image capturing device, and the fourth sub-image capturing device) may be a separate camera device, such as a camera.

It should be understood that, when a plurality of camera devices are respectively used to capture initial images of different key regions of different first parts of the user, positions of the camera devices need to be set according to specific first parts to be captured. For example, a camera device for capturing the eye initial image may be disposed at a position directly in front of an eye. When the system for generating a posture virtual image is used for a head-mounted virtual reality device, the camera device for capturing the eye initial image needs to be disposed in a head-mounted assembly.

Exemplary Device

Figure 8:
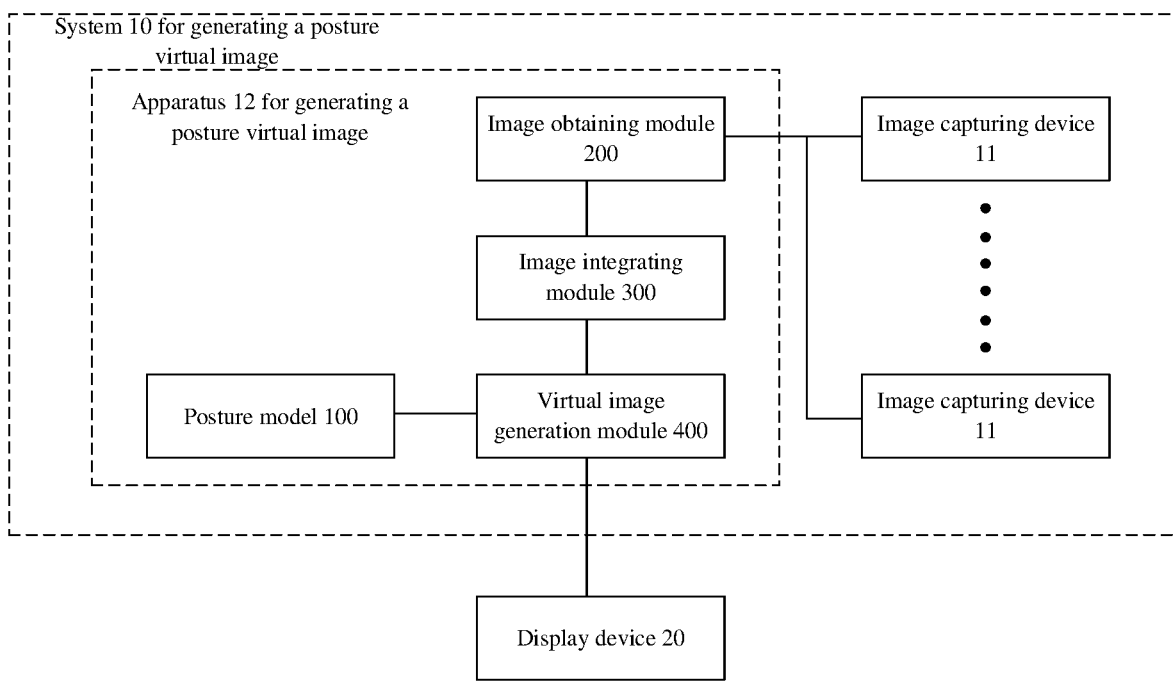
FIG. 8 is a working principle diagram of a virtual reality device according to an embodiment of the present disclosure.

FIG. 8 is a working principle diagram of a virtual reality device according to the present disclosure. As shown in FIG. 8, the virtual reality device includes the system 10 for generating a posture virtual image; and a display device 20, configured to display a virtual image generated by the system for generating a posture virtual image.

Optionally, the virtual reality device further includes a head-mounted assembly, configured to be worn on the head of a user. The display device is disposed in the head-mounted assembly.

Optionally, a plurality of image capturing devices include: a first image capturing device, configured to capture an eye initial image. The first image capturing device is disposed in the head-mounted assembly.

Optionally, the plurality of image capturing devices include: a second image capturing device, configured to capture a mouth initial image. The second image capturing device is disposed outside the head-wearing assembly.

Optionally, the plurality of image capturing devices include: a third image capturing device, configured to capture a limb initial image. The third image capturing device is disposed in the head-mounted assembly.

Exemplary Electronic Device

Figure 9:
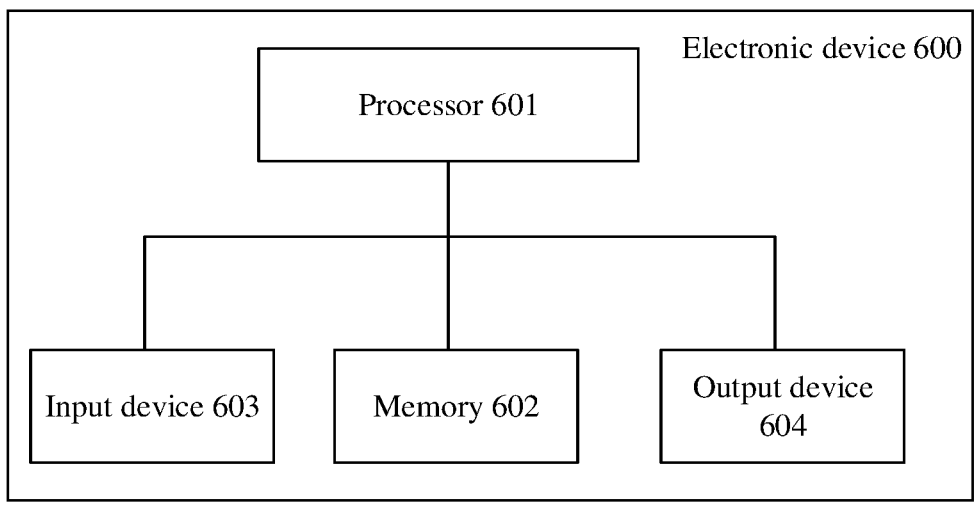
FIG. 9 is a working principle diagram of an electronic device according to an embodiment of the present disclosure.

An electronic device according to an embodiment of the present disclosure is described below with reference to FIG. 9. FIG. 9 is a schematic structural diagram of an electronic device according to an embodiment of the present disclosure.

As shown in FIG. 9, an electronic device 600 includes one or more processors 601 and a memory 602.

The processor 601 may be a Central Processing Unit (CPU) or a processing unit in another form that has a data handling capacity and/or information execution capacity, and may control another component in the electronic device 600 to perform a desired function.

The memory 602 may include one or more computer program products. The computer program product may include computer-readable storage mediums in various forms, for example, a volatile memory and/or a nonvolatile memory. The volatile memory may include, for example, a random access memory (RAM) and/or a high-speed buffer memory (cache). The nonvolatile memory may include, for example, a read-only memory (ROM), a hard disk, or a flash memory. The computer-readable storage medium may store one or more pieces of computer program information. The processor 601 may run the program information to implement the method for generating a posture virtual image of a user according to the foregoing embodiments of the present disclosure or another desired function.

In an example, the electronic device 600 may further include an input device 603 and an output device 604. These components may be interconnected to each other by using a bus system and/or a connecting mechanism in another form (not shown in the figure).

The input device 603 may include, for example, a keyboard, and a mouse.

The output device 604 may output various information. The output device 604 may include, for example, a display, a communication network, and a remote output device connected thereto.

Certainly, for simplicity, FIG. 9 only shows some of components in the electronic device 600 that are related to the present disclosure, and does not show components such as a bus, and an input/output interface. In addition, according to a specific application situation, the electronic device 600 may further include another proper component.

In addition to the foregoing methods and devices, the embodiments of the present disclosure may alternatively be a computer program product, where the computer program product includes computer program information. When the computer program information is run by a processor, the processor implements the steps of the method for generating a posture virtual image of a user according to the embodiments of the present disclosure described in the specification.

The computer program product may use any combination of one or more programming languages to write a program code for performing operations in the embodiments of the present disclosure. The programming languages include an object oriented programming language, such as Java, C++, and conventional procedural programming language, such as the "C" language or a similar programming language. The program code may be entirely executed on a user's computing device, partially on a user's computing device, executed as an independent software package, partially executed on a user's computing device and partially executed on a remote computing device, or entirely executed on a remote computing device or a server.

In addition, an embodiment of the present disclosure may further provide a computer-readable storage medium. The computer-readable storage medium stores computer program information. When the computer program information is run by a processor, the processor implements the steps of the method for generating a posture virtual image of a user according to the embodiments of the present disclosure described in the specification.

The computer-readable storage medium may use any combination of one or more readable media. The readable medium may be a readable signal medium or readable storage medium. The readable storage medium may include but is, for example, not limited to, an electronic, magnetic, optical, electromagnetic, infrared, or semiconductor system, apparatus, or means, or any combination thereof. More specific examples (a non-exhaustive list) of the readable storage medium include an electrical connection having one or more wires, a portable disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage means, a magnetic storage means, or any suitable combination thereof.

A basic principle of the present disclosure is described with reference to the specific embodiments. However, it should be noted that, the advantages, merits, effects, and the like mentioned in the present disclosure are only examples but not limitations, and it cannot be considered that these advantages, merits, effects, and the like must be provided in the embodiments of the present disclosure. In addition, the specific details disclosed above are for illustrative purpose and for case of understanding only, but are not for limitations, and are not intended to limit that the present disclosure must be implemented using the specific details.

The block diagrams of means, apparatuses, devices, and systems related in the present disclosure are only examples for illustrative purposes, and are not intended to require or imply that these means, apparatuses, devices, and systems must be connected, arranged, and configured in the manners shown in the block diagrams. As those skilled in the art will recognize that, these means, apparatuses, devices, and systems can be connected, arranged, and configured in any manner. Words such as "including", "comprising", and "having" are open words, which refer to "including but not limited to" and may be used interchangeably with it. The words "or" and "and" used herein refer to the word "and/or", and may be used interchangeably with it, unless the context clearly indicates otherwise. The word "such as" used herein refer to the phrase "such as but not limited to", and may be used interchangeably with it.

It should also be noted that in the apparatus, device and method of the present disclosure, each component or step can be decomposed and/or recombined. These decompositions and/or recombinations shall be considered equivalent solutions of the present disclosure.

The above description of the disclosed aspects is provided to enable any person skilled in the art to practice or use the present disclosure. Various modifications to these aspects are very obvious to those skilled in the art, and the general principles defined herein may be applied to other aspects without departing from the scope of the present disclosure. Therefore, the present disclosure is not intended to be limited to these aspects shown herein, but extends to the widest scope that complies with the principles and novel features disclosed in the present disclosure.

The foregoing descriptions are merely preferable embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A method for generating a posture virtual image of a user, comprising:
constructing a posture model of the user, wherein the posture model comprises a plurality of standard posture images;
separately obtaining initial images of a plurality of key regions of a first part of the user, and extracting, from the initial images, position information of a plurality of feature points corresponding to each of the plurality of key regions;
integrating the initial images of the plurality of key regions according to the plurality of key regions and the position information of the plurality of feature points, to generate a first part image of the first part; and
searching for, in the posture model, a standard posture image having the highest matching degree with the first part image according to the plurality of key regions and the position information of the plurality of feature points and taking the standard posture image as a virtual image of the first part; wherein the first part comprises a body, the posture model comprises a body model, and the body model comprises a plurality of standard body images;
the separately obtaining initial images of a plurality of key regions of a first part of the user, and extracting, from the initial images, position information of a plurality of feature points corresponding to each of the plurality of key regions comprises:
separately obtaining a mouth initial image, two eye initial images, and a limb initial image of the user, and extracting position information of a plurality of mouth feature points from the mouth initial image, position information of a plurality of eye feature points from the two eye initial images, and position information of a plurality of limb feature points from the limb initial image;
the integrating the initial images of the plurality of key regions according to the plurality of key regions and the position information of the plurality of feature points, to generate a first part image of the first part comprises:
integrating the mouth initial image, the two eye initial images, and the limb initial image to generate a body image of the user according to the position information of the plurality of mouth feature points, the position information of the plurality of eye feature points, and the position information of the plurality of limb feature points; and
the searching for, in the posture model, a standard posture image having the highest matching degree with the first part image according to the plurality of key regions and the position information of the plurality of feature points and taking the standard posture image as a virtual image of the first part comprises:
searching for, in the body model, a standard body image having the highest matching degree with the body image, according to the position information of the plurality of mouth feature points, the position information of the plurality of eye feature points, and the position information of the plurality of limb feature points, and taking the standard body image as a body virtual image of the user.

2. The method for generating a posture virtual image of a user according to claim 1, wherein the position information of the plurality of eye feature points comprises: position information of a first canthus feature point and a second canthus feature point respectively located on both sides of an eye, position information of an upper eyelid feature point, and position information of a lower eyelid feature point.

3. The method for generating a posture virtual image of a user according to claim 1, wherein the two eye initial images comprise a left eye initial image and a right eye initial image.

4. The method for generating a posture virtual image of a user according to claim 1, wherein the limb initial image comprises a left upper limb image, a left lower limb image, a right upper limb image, and a right lower limb image.

5. The method for generating a posture virtual image of a user according to claim 1, wherein the integrating the initial images of the plurality of key regions according to the plurality of key regions and the position information of the plurality of feature points, to generate a first part image of the first part comprises:
integrating the initial images of the plurality of key regions according to the plurality of key regions and the position information of the plurality of feature points, to generate an initial first part image of the first part; and
performing preprocessing on the initial first part image to generate the first part image.

6. A device for generating a posture virtual image of a user, comprising a memory having a computer program stored thereon, and a processor configured to execute the computer program to implement steps of the method for constructing a posture model of the user according to claim 1, the method comprising:
constructing a posture model of the user, wherein the posture model comprises a plurality of standard posture images;
separately obtaining initial images of a plurality of key regions of a first part of the user, and extracting, from the initial images, position information of a plurality of feature points corresponding to each of the plurality of key regions;
integrating the initial images of the plurality of key regions according to the plurality of key regions and the position information of the plurality of feature points, to generate a first part image of the first part; and
searching for, in the posture model, a standard posture image having the highest matching degree with the first part image according to the plurality of key regions and the position information of the plurality of feature points and taking the standard posture image as a virtual image of the first part; wherein the first part comprises a body, the posture model comprises a body model, and the body model comprises a plurality of standard body images;
the separately obtaining initial images of a plurality of key regions of a first part of the user, and extracting, from the initial images, position information of a plurality of feature points corresponding to each of the plurality of key regions comprises:
separately obtaining a mouth initial image, two eye initial images, and a limb initial image of the user, and extracting position information of a plurality of mouth feature points from the mouth initial image, position information of a plurality of eye feature points from the two eye initial images, and position information of a plurality of limb feature points from the limb initial image;
the integrating the initial images of the plurality of key regions according to the plurality of key regions and the position information of the plurality of feature points, to generate a first part image of the first part comprises:
integrating the mouth initial image, the two eye initial images, and the limb initial image to generate a body image of the user according to the position information of the plurality of mouth feature points, the position information of the plurality of eye feature points, and the position information of the plurality of limb feature points; and
the searching for, in the posture model, a standard posture image having the highest matching degree with the first part image according to the plurality of key regions and the position information of the plurality of feature points and taking the standard posture image as a virtual image of the first part comprises:
searching for, in the body model, a standard body image having the highest matching degree with the body image, according to the position information of the plurality of mouth feature points, the position information of the plurality of eye feature points, and the position information of the plurality of limb feature points, and taking the standard body image as a body virtual image of the user.

7. The device for generating a posture virtual image of a user according to claim 6, wherein the position information of the plurality of eye feature points comprises: position information of a first canthus feature point and a second canthus feature point respectively located on both sides of an eye, position information of an upper eyelid feature point, and position information of a lower eyelid feature point.

8. The device for generating a posture virtual image of a user according to claim 6, wherein the two eye initial images comprise a left eye initial image and a right eye initial image.

9. The device for generating a posture virtual image of a user according to claim 6, wherein the limb initial image comprises a left upper limb image, a left lower limb image, a right upper limb image, and a right lower limb image.

10. The device for generating a posture virtual image of a user according to claim 6, wherein the integrating the initial images of the plurality of key regions according to the plurality of key regions and the position information of the plurality of feature points, to generate a first part image of the first part comprises:
integrating the initial images of the plurality of key regions according to the plurality of key regions and the position information of the plurality of feature points, to generate an initial first part image of the first part; and
performing preprocessing on the initial first part image to generate the first part image.

11. A non-transitory computer storage medium having stored thereon one or more computer programs which, when executed by one or more processors, implement steps of the method for constructing a posture model of the user according to claim 1.

* * * * *